US010823881B2

(12) United States Patent
Yan et al.

(10) Patent No.: US 10,823,881 B2
(45) Date of Patent: Nov. 3, 2020

(54) CLOUD FORECAST USING SEQUENTIAL IMAGES

(71) Applicant: Tianjin Kantian Technology Co., Ltd., Tianjin (CN)

(72) Inventors: Simeng Yan, Burlingame, CA (US); Yang Lu, Burlingame, CA (US)

(73) Assignee: Tianjin Kantian Technology Co., Ltd., Tianjin (CN)

( * ) Notice: Subject to any disclaimer, the term of this patent is extended or adjusted under 35 U.S.C. 154(b) by 163 days.

(21) Appl. No.: 16/180,918

(22) Filed: Nov. 5, 2018

(65) Prior Publication Data

US 2020/0142095 A1  May 7, 2020

(51) Int. Cl.

| | |
|---|---|
| *G01W 1/10* | (2006.01) |
| *G06T 7/20* | (2017.01) |
| *G06K 9/62* | (2006.01) |
| *G06T 7/11* | (2017.01) |
| *G06T 7/70* | (2017.01) |

(Continued)

(52) U.S. Cl.
CPC .............. *G01W 1/10* (2013.01); *G06K 9/6215* (2013.01); *G06T 7/11* (2017.01); *G06T 7/20* (2013.01); *G06K 2009/6213* (2013.01); *G06T 7/13* (2017.01); *G06T 7/70* (2017.01); *G06T 7/90* (2017.01); *G06T 2207/10016* (2013.01); *G06T 2207/20081* (2013.01); *G06T 2207/30192* (2013.01)

(58) Field of Classification Search
CPC ... G01W 1/10; G06T 7/20; G06T 7/11; G06T 7/70; G06T 2207/20081; G06T 7/90; G06T 2207/30192; G06T 2207/10016; G06T 7/13; G06K 9/6215; G06K 2009/6213

See application file for complete search history.

(56) References Cited

U.S. PATENT DOCUMENTS

2015/0301226 A1* 10/2015 Sun ........................ G01W 1/12
                                                               702/3
2017/0351970 A1* 12/2017 Abedini ................ G06T 1/0007
(Continued)

OTHER PUBLICATIONS

U.S. Appl. No. 15/958,861, filed Apr. 20, 2018, Yan et al.

*Primary Examiner* — Helen Zong
(74) *Attorney, Agent, or Firm* — BakerHostetler

(57) ABSTRACT

Techniques for cloud forecast using configuration engine, segment cloud coverage determination engine, and trained forecast models are described herein. The disclosed techniques include generating a configuration mask based on a type of an optical component for capturing a plurality of sky images and determining cloud coverages of a plurality of corresponding segments by applying the configuration mask and a segment cloud coverage determination algorithm to the plurality of images. The disclosed techniques include training a plurality of forecast models for forecasting cloud coverages of the plurality of corresponding segments using the determined cloud coverages. The plurality of forecast models correlate cloud coverages of the plurality of corresponding segments at a time point with a cloud coverage of any particular segment at a later time point. The plurality of trained forecast models generate data indicative of cloud coverages of the plurality corresponding segments at a future time point.

20 Claims, 15 Drawing Sheets

(51) Int. Cl.
*G06T 7/90* (2017.01)
*G06T 7/13* (2017.01)

(56) References Cited

U.S. PATENT DOCUMENTS

2019/0136618 A1* 5/2019 Hebeisen ................ G05B 17/02
2019/0158011 A1* 5/2019 West ...................... G06N 20/20

* cited by examiner

| User ID | Device ID | Latitude | Longtitude | Timestamp | Segment No. | Determined Segment Coverage | Image Data | ... |
|---------|-----------|----------|------------|-----------|-------------|------------------------------|------------|-----|
| ... | ... | ... | ... | ... | ... | ... | ... | |

CLOUD FORECAST USING SEQUENTIAL IMAGES

BACKGROUND

Conventional weather forecasters have a variety of tools to obtain weather information, such as conventional weather stations and weather satellites. Conventional weather stations can collect numerical data of wind speed, air temperature, air pressure, and so on. Weather satellites can show cloud formations and large-scale weather events, such as hurricanes. Even so, conventional weather stations are spread miles apart, and typically limited to gather numerical data. Weather satellites are positioned thousands of miles above the earth, and limited to view large-scale weather events. Subject to various limitations, current weather forecasts' accuracy cannot fulfill needs of people. For example, outdoor enthusiasts or avid travelers need accurate and local weather information to arrange their outdoor or travelling plans. Likewise, business people need precise and local weather forecasts to optimize processes and decrease weather-related economic risks. Cloud information is a valuable data source for accurate weather forecasts.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 11 is a simplified diagram illustrating example data metrics of a database for storing determined segment cloud coverages.

FIG. 14 is a chart illustrating comparisons between observation data and forecast data generated by forecast models.

DETAILED DESCRIPTION OF ILLUSTRATIVE EMBODIMENTS

Figure 1:
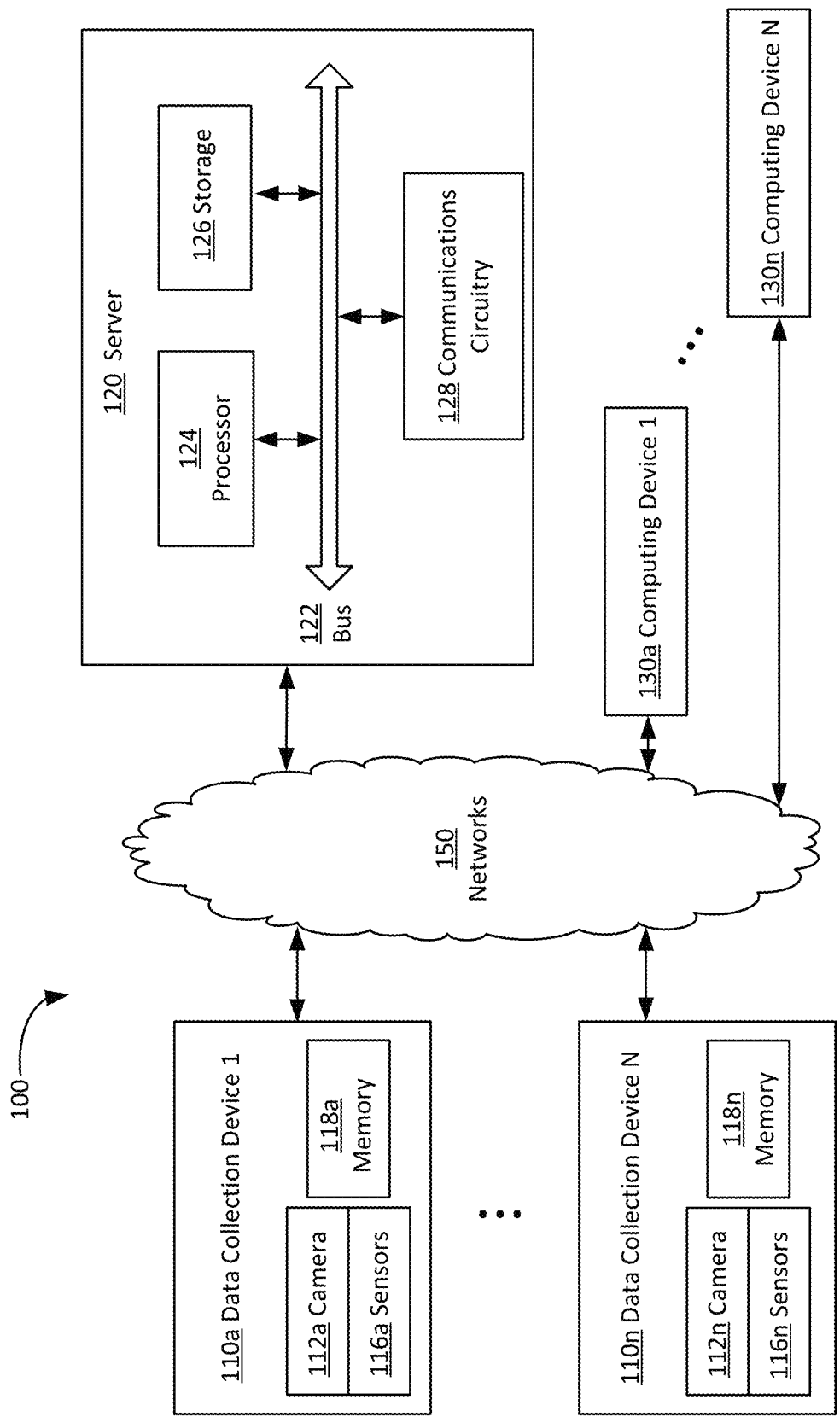
FIG. 1 is a schematic diagram illustrating an example system for collecting and processing data that may be used in accordance with the present disclosure.

FIG. 1 is a schematic diagram illustrating an example system 100 for collecting and processing data that may be used in accordance with the present disclosure. As shown, the system 100 comprises a plurality of data collection devices 110a . . . , and 110n (collectively, 110), at least a server 120, and a plurality of computing devices 130a . . . , and 130n (collectively, 130). The data collection devices 110 and the computing devices 130 may communicate with the server 120 via one or more networks 150.

The data collection devices 110 are used to capture sky images and collect numerical data, such as temperature, humidity, barometric pressure, and precipitation. The data collection devices 110 may further collect data associated with wind speed, wind direction, rainfall, and UV exposure. The data collection devices 110 may be installed in any places on the earth, thereby forming a dense network of weather data collection devices. For instance, the data collection devices 110 may be installed in the ground or mounted on any suitable structures. Preferably, the data collection devices 110 are installed in locations with clear view of sky and as far as possible away from tall obstacles, such as trees, buildings, and fences.

The data collection devices 110 comprise cameras 112 for capturing sky images from the ground. The sky images depict motion and formation of cloud layer in the atmosphere and contain valuable information for cloud forecast. The sky images are associated with temporal signals (e.g., timestamps) based on corresponding time points at which the sky images are captured. By way of example and without any limitation, the cameras of the data collection devices 310 may be programmed to take pictures every certain time interval, such as every three or five minutes. The sky images are also associated with spatial signals (e.g., latitudes and longitudes) based on corresponding installation locations of the data collection devices 110.

The cameras 112 may be HD cameras with ultra-wide angle lens (e.g., 170 degree). The cameras 112 may be any other suitable cameras. By way of example and without any limitation, the camera 112 may comprise a fisheye lens that is an ultra-wide angle lens and capable of creating a wide panoramic image. The angle of view of a fisheye leans is usually between 100 and 180 degrees at the cost of distorted image edges.

Figure 2B:
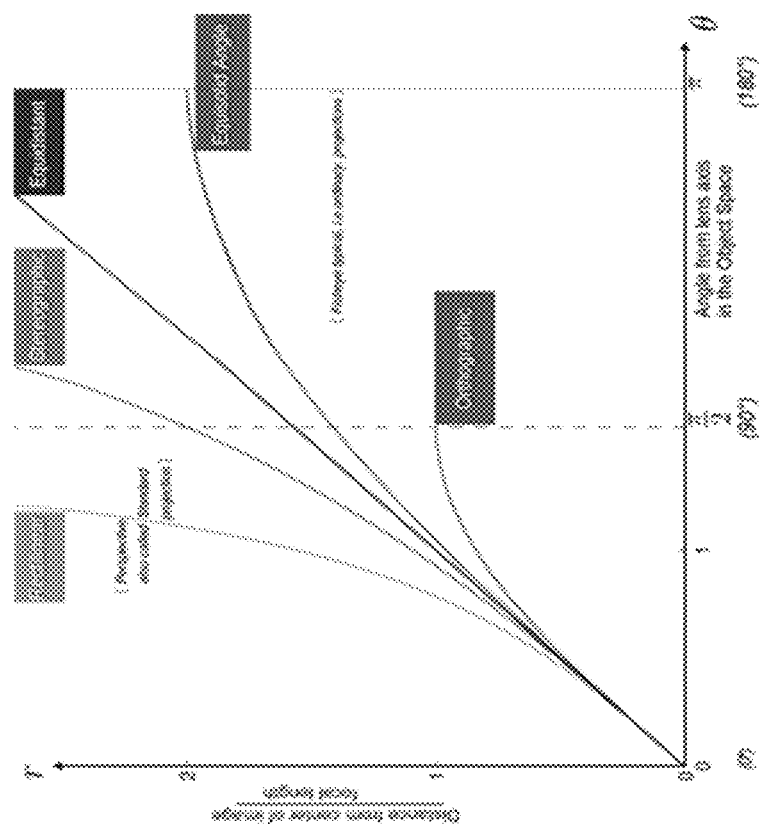
FIGS. 2A-2B illustrates examples of an optical path and projection functions of a fisheye lens that may be used in accordance with the present disclosure.
Figure 2A:
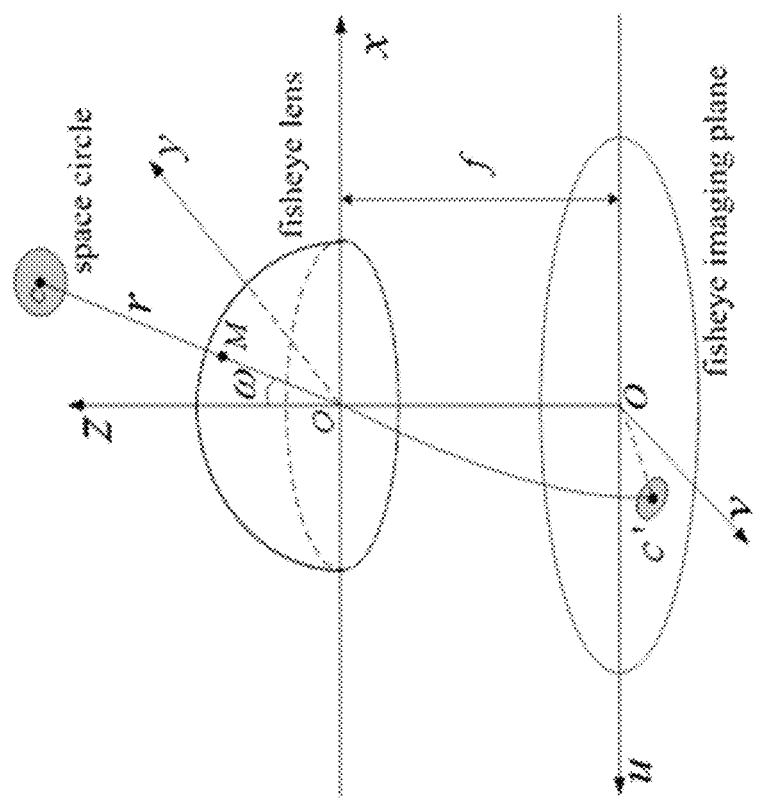

FIG. 2A illustrates an example of an optical path of a fisheye lens that may be used in accordance with the present disclosure. The hemisphere in the middle represents the fisheye lens; C is an object, such as a cloud in a sky area; and C' is an image of the object (e.g., cloud) on a fisheye imaging plane (e.g., on a sky image). As shown, r is the distance from object C to the optical center O of the fisheye lens; co is the zenith angle; and (x, y) and (u, v) are the geographic and imaging plane coordinates, respectively. A light ray from cloud C transmits through the fisheye lens O and projects an image C' on the sky image. As illustrated in FIG. 2B, fisheye lenses may have different projection functions. The equidistant and equisolid projection functions can maintain useful geometric properties. By the way of example and without any limitation, the cameras 112 may adopt the equidistant projection function.

In some examples, the cameras 112 each may be fixed toward a particular sky area, and they each may gather a series of time-sequenced sky images of a particular sky area every day (i.e., an image stream). By way of example and without limitation, the cameras 112 may be programmed to capture sky images every certain time interval, such as every three or five minutes. At the end of each day, a series of sky images captured from a particular location may be combined into a spectacular time-lapse video for users to view and share. The data collection devices 110 may capture numerous series of time-sequenced sky images from various locations around the world. The numerous series of time-sequence sky images are value data sources for cloud forecast.

The data collection devices 110 may also comprise sensors 116 for gathering temperature, humidity, barometric pressure, precipitation, wind speed, wind direction, UV exposure, and other data collection sensors. The sensors can be any suitable sensors for measuring corresponding parameters. The data collection devices 110 may further comprise memories 118 for storing the image and numerical data.

Typically, the data collection devices 110 may transmit data via the networks 150 to the server 120 for storing and processing. For example, the data collection devices 110 each may comprise an outdoor unit and an indoor unit. The outdoor unit may collect and transmit data to the indoor unit by wireless communication. The indoor unit may further transmit the collected data to a cloud-based server, such as the server 120.

The server 120 may host one or more applications configured to manage services. For example, the server 120 may be configured to validate the computing devices 130 before they are authorized to access stored data. The server 120 may maintain information related to a user account including account details and others. The server 120 may operate one or more image libraries comprising images captured by the data collection devices 110, which may be accessed by the computing devices 130. Also, the server 120 may host one or more applications configured to interact with applications stored on the computing devices 130.

The server 120 may include a bus 122 which interconnects major components of the server 120, such as one or more processors 124, one or more storage devices 126, and communications circuitry 128. The processors 122 may be any suitable programmable control devices. The processors 122 may process data captured by the data collection devices 110 and extract various weather/climate information from image data. The storage devices 126 may be integral with the server 120 or may be separate and accessed through an interface. The storage devices 126 may store image streams captured by the data collection devices 110, software for implementing various functions on the server 120, and other data. The communications circuitry 128 may include one or more interfaces to allow the server 120 to communicate with the data collection devices 110, the computing devices 130, other servers, and/or databases via the one or more networks 150. The server 120 may be a cloud-based server.

Figure 3:
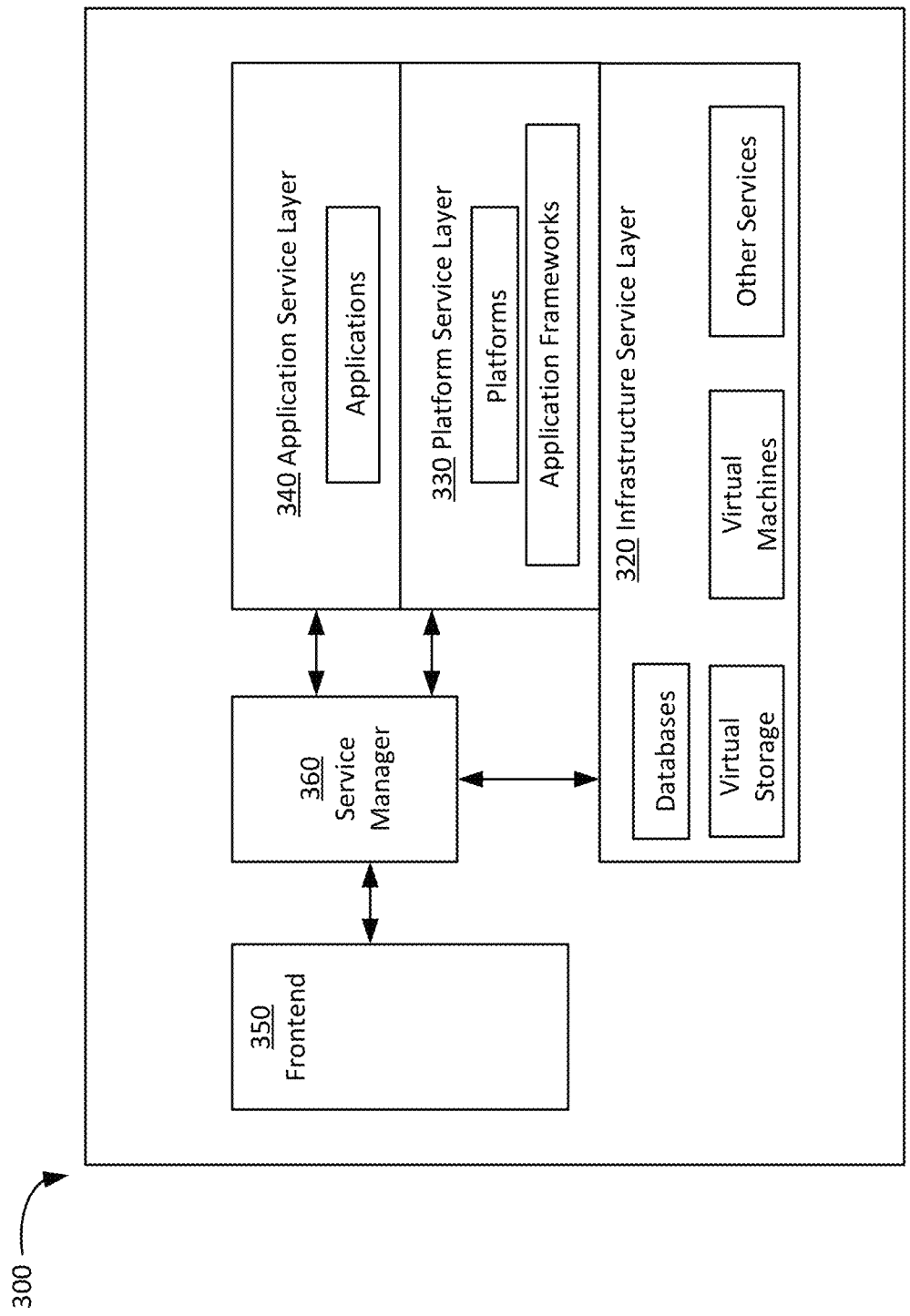
FIG. 3 is a schematic diagram illustrating an example cloud-based server that may be used in accordance with the present disclosure.

FIG. 3 is a schematic diagram illustrating an example cloud-based server 300 that may be used in accordance with the present disclosure. The cloud-based server 300 may provide infrastructure services, platform services, and software application services. The infrastructure services may include virtualized resources, such as virtual machines, virtual storage, and so on. The infrastructure services may also include virtualized services, such as database services and others. Each of these infrastructure services may be deployed in an infrastructure service layer 320.

The scale and various aspects, such as data, connectivity, and dependency relationships within and between service components, of an infrastructure service deployment are configurable by an administrator user. For instance, the administrator user may submit a configuration specification to the cloud-based server 300 via a frontend interface 350 and service manager 360. The configuration specification can be translated into infrastructure and kernel level APIs calls that create, re-create, move, or delete components such as virtual machines and services, and assign or change attributes of the components.

In addition to the infrastructure services, the cloud-based server 300 may also provide platform services, such as an environment for running virtual machines or a framework for developing and launching a particular type of software applications. The platform services may be implemented in a platform service layer 330 over the infrastructure service layer 320, and may employ one or more infrastructure services configured in a particular manner. Configuration of platform services can be accomplished by program code written according to the APIs of the platform services and, optionally, the APIs of the infrastructure services that are employed in enabling the platform services.

In some examples, the cloud-based server 300 may also provide software application services in an application service layer 340. A software application can be installed on one or more virtual machines or deployed in an application framework in the platform service layer 330. The software application can also communicate with one or more infrastructure service components, such as databases, in the infrastructure layer 320. The installation and configuration of the software application in the application service layer 340 can be accomplished through APIs of the software itself and the APIs of the underlying platform and infrastructure service components.

Depending on the type of services, a cloud-service user may be granted different levels of control in configuring the services. For example, if a software application service is employed, an administrator user is given control over how the software application is configured. If a platform service is employed, an administrative user is given control over how the platform and/or application frameworks are configured. Similarly, if infrastructure services are employed, an administrative user is given control over the particular infrastructure services employed.

Figure 4:
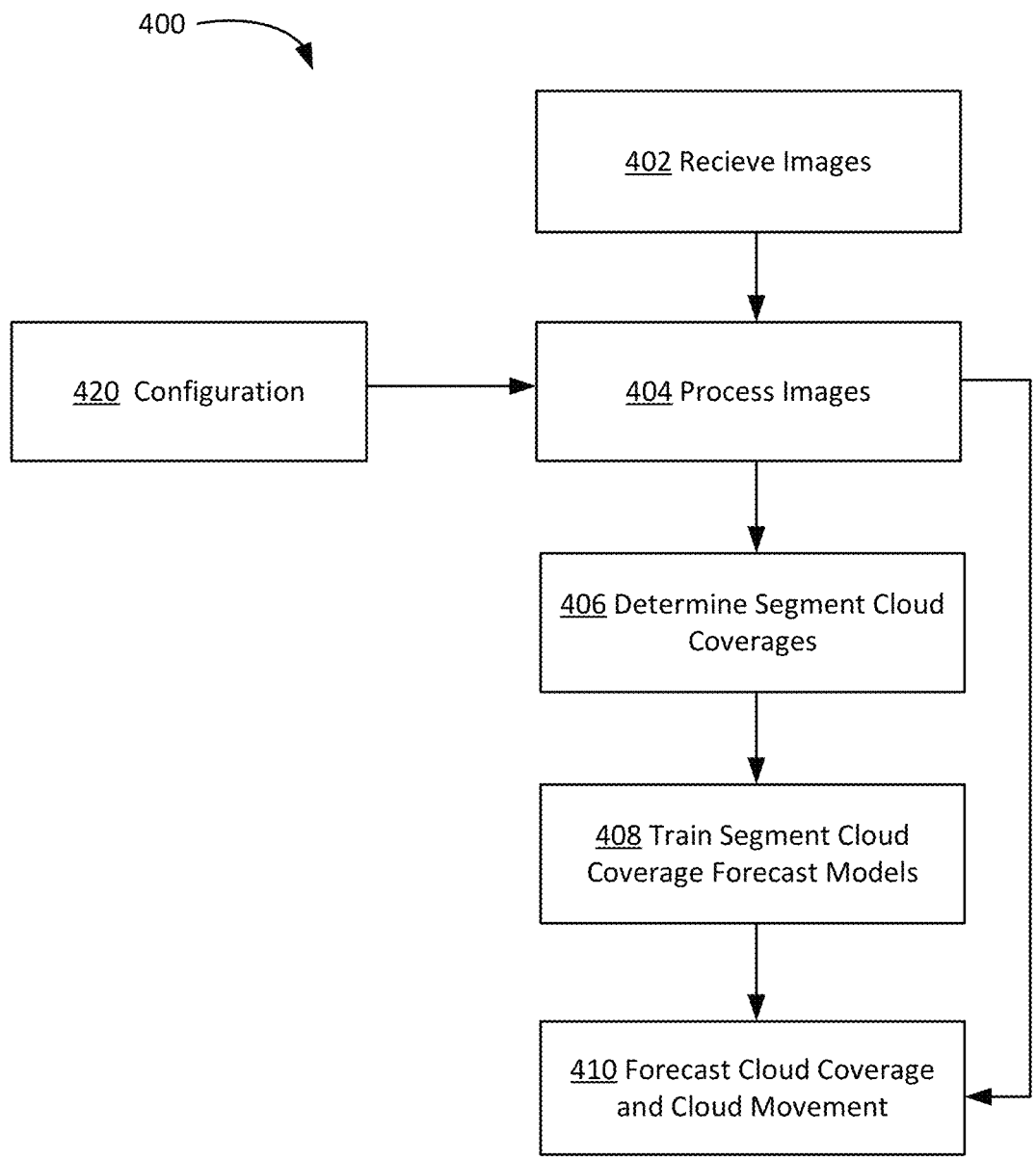
FIG. 4 is a flowchart illustrating an example process 400 for cloud forecast using image data that may be used in accordance with the present disclosure.

FIG. 4 is a flowchart illustrating an example process 400 for cloud forecast using image data. The server 120, such as the cloud-based server 200, the computing devices 130, or other computing devices may be used singly or in combination to implement the cloud forecast process 400. Although depicted as a sequence of operations, those of ordinary skill in the art will appreciate that various embodiments may add, remove, reorder, or modify the depicted operations.

Operation 402 illustrates receiving sky images. In some embodiments, the sky images may be provided by one of the data collection devices 110 or other image capturing devices. In other embodiments, the image data may be provided by the server 120, such as the cloud-based server 200, or other separate cloud storage servers, in which the sky images are stored. In an example, a series of time-sequenced sky images captured by the same data collection device every certain time interval, such as every five minutes, may be received at operation 402. The cloud forecast process 400 may be used to forecast cloud coverage and cloud movement.

Operation 404 illustrates applying a configuration mask generated by a configuration algorithm 420 to the sky images. In some examples, the configuration mask may be generated by one of the computing devices for performing the cloud forecast process 400. In other examples, the configuration mask may be generated by a separate computing device. The configuration mask may be received by the computing device(s) for executing the cloud forecast process 400 via the networks 150. In some examples, the configuration mask may be pre-saved in any suitable storage devices.

Figure 5:
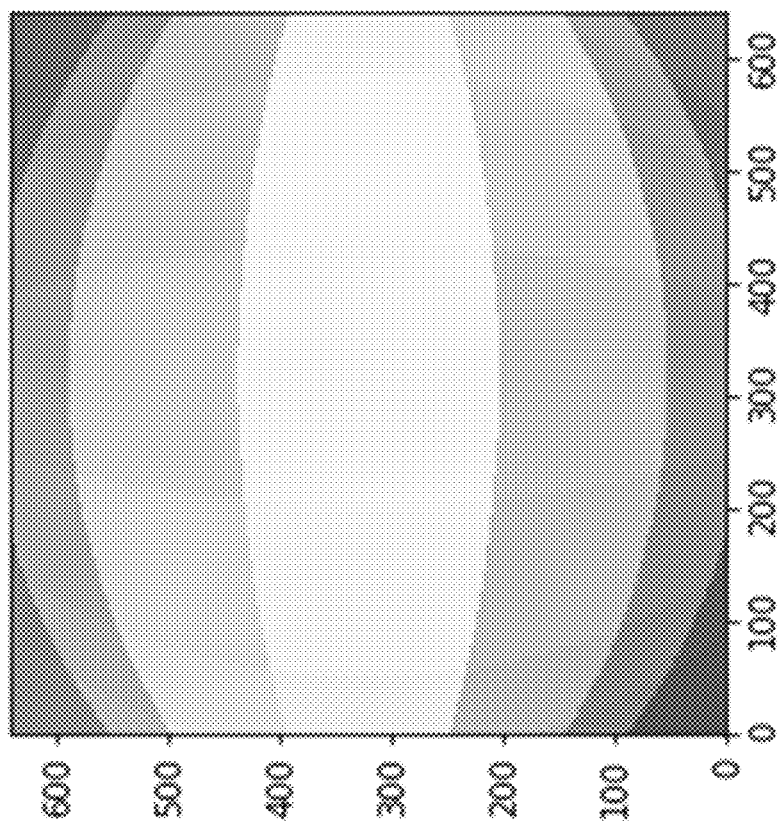
FIG. 5 illustrates an example of a configuration mask for sky images captured by a fisheye lens that may be used in accordance with the present disclosure.

The configuration mask reflects view perspective of camera lens used to capture the sky images. The configuration algorithm 420 may generate different configurations in accordance with different types of camera lenses used for capturing sky images. In some embodiments, the data collection devices 110 comprise the fisheye lenses as described above. A corresponding configuration mask reflecting cloud image on the imaging plane of the fisheye lens may be received. In some examples, a fisheye lens with field of view (FOV) of 120 degree may be used to capture sky images. Assuming that sky area comprises tiles of 1 km by 1 km at a height of 2 km, the configuration algorithm 420 may generate a configuration mask for sky images captured by the fisheye lens with FOV 120. FIG. 5 illustrates an example of a configuration mask for sky images captured by the fisheye lens with FOV 120. The configuration mask as shown in FIG. 5 may be received at operation 404. It should be appreciated other data preprocessing may be performed at operation 404 so as to improve quality of image data.

Operation 406 illustrates determining cloud coverages of segments of any sky image. A segment cloud coverage determination algorithm may be used to determine cloud coverages of segments of the sky image. Embodiments of the segment cloud coverage determination engine will be described in greater detail below in reference to FIG. 10.

Figure 6:
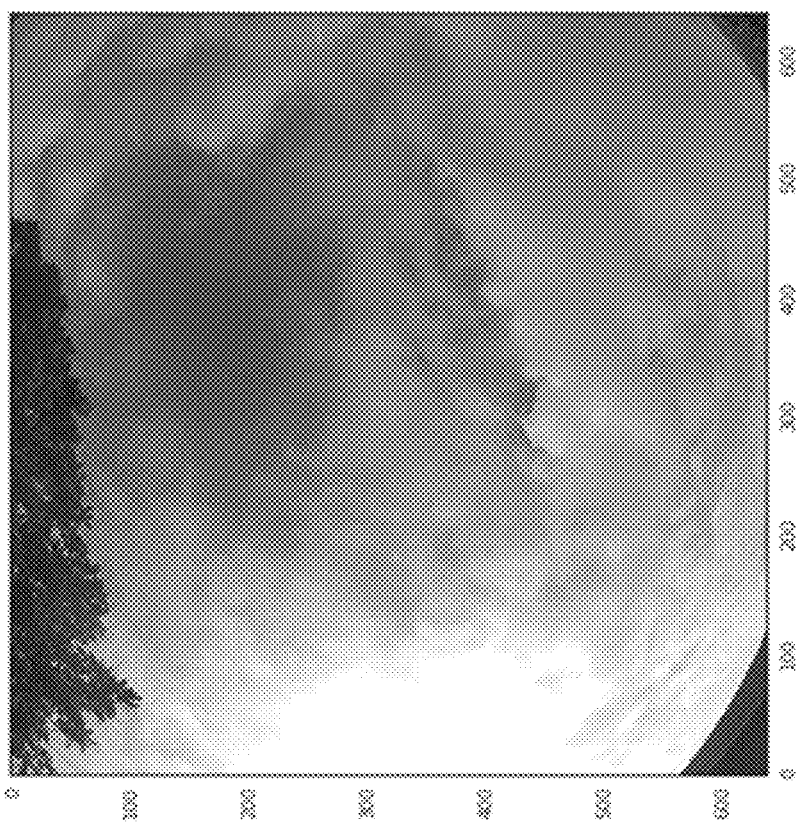
FIG. 6 illustrates an example sky image captured by a fisheye lens.
Figure 7:
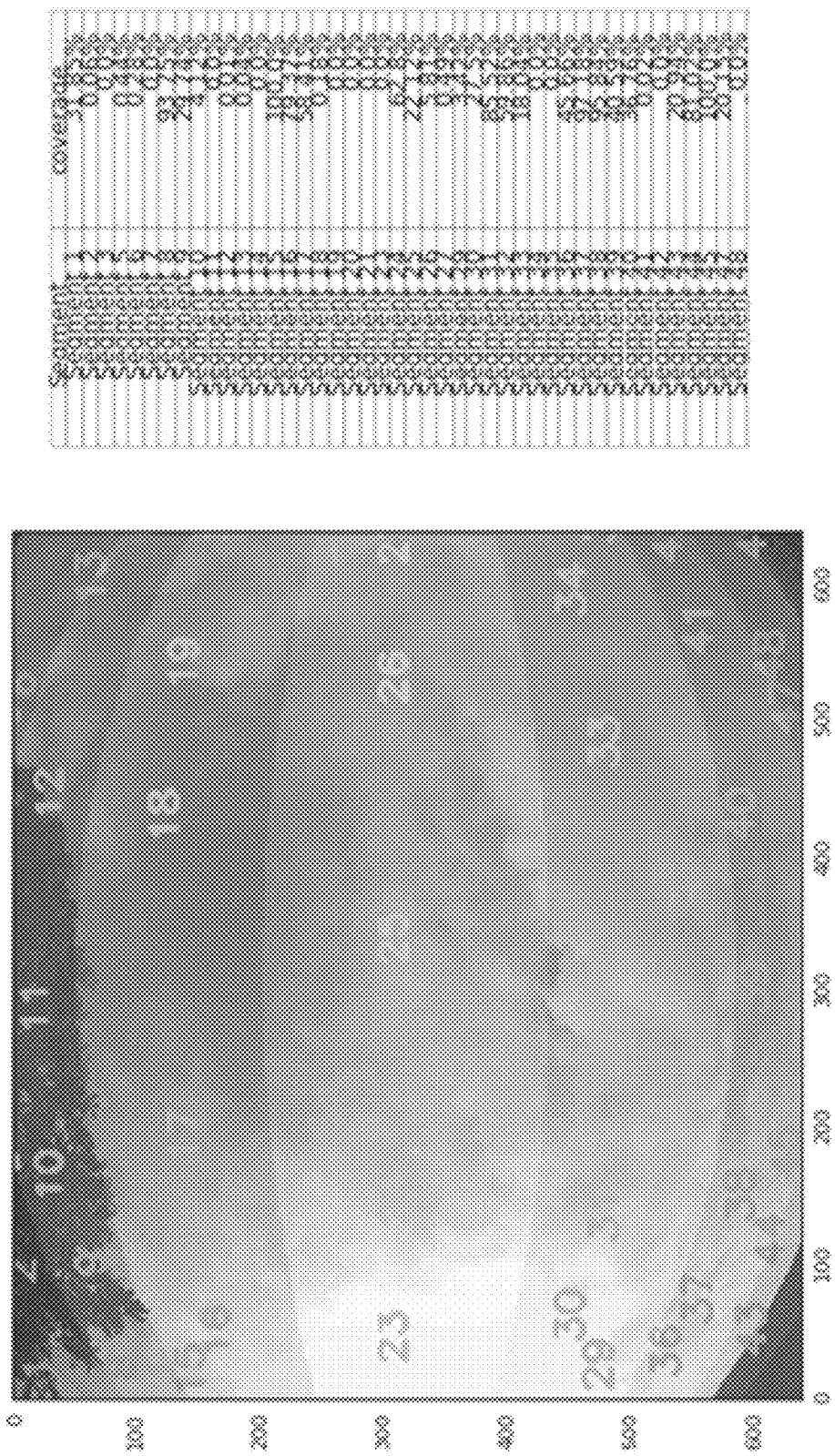
FIG. 7 illustrates an example of the result after applying a configuration mask and a segment cloud coverage determination algorithm to the example sky image and corresponding determined cloud coverages of segments.

FIG. 6 illustrates an example sky image captured by the fisheye lens with FOV 120. FIG. 7 illustrates an example of the result after applying the configuration mask as shown in FIG. 5 and the segment cloud coverage determination algorithm to the example sky image and corresponding determined cloud coverages of segments. As shown in FIG. 7, the sky image is segmented into Segment 1 through Segment 48. The objects in the middle of the image (i.e., Segment 25) appear bigger than the ones on the corners (e.g., Segment 1 or Segment 48) due to the image projection function. However, the actual geographic sizes are the same between different segments. The determined cloud coverage of each segment may be treated equally to quantify an overall cloud coverage of the sky image. The determined segment cloud coverage data may be stored to one or more databases. In some examples, cloud coverages of segments of a series of time-sequenced sky images captured by the same data collection device may be determined and stored to one or more historical segment cloud coverage database.

Operation 408 illustrates training a plurality of forecast models for forecasting cloud coverages of a plurality of segments (e.g., 48 segments). In some embodiments, training data may be obtained from one or more databases that store historical segment cloud coverages determined by the segment cloud coverage determination algorithm as further described below. The training data may be obtained by the computing device for executing operation 408 via the networks 150.

In some examples, historical segment cloud coverages of a series of time-sequenced sky images captured during a certain period, such as during last one hour, may be used to train the forecast models. The time-sequenced sky images were captured by the same type of camera lens from the same location. In other words, the time-sequenced sky images cover the same sky area. Each of the time-sequenced sky images comprises a plurality of corresponding segments. By training, a particular forecast model corresponding to a particular segments among the plurality of forecast models may learn a correlation between cloud coverages of the plurality of segments at a first time point and a cloud coverage of the particular segment at a later time point (e.g., 20-minute later than the first time point).

Operation 410 illustrates forecasting cloud coverage and cloud movement using trained forecast models. In some embodiments, a sky image currently captured may be fed into the trained forecast models after the sky image is processed at operation 404. In other embodiments, the trained forecast models may acquire a sky image from one or more databases.

After training by historical segment cloud coverage data of a series of time-sequenced sky images, the plurality of forecast models are capable of forecasting cloud coverages of the plurality of segments at a future time point, such as 20-minute later than the timestamp of the sky image fed into the forecast models. It should be appreciated that forecast models may be trained and forecast cloud coverages of segments at any other future time point, e.g., a time point of 10-minute or 30-minute later. In some embodiments, a cloud coverage of the same sky area covered by the time-sequenced sky image may be predicted by averaging coverage forecasts of the plurality of segments. In other embodiments, a cloud movement direction in the same sky area may also be forecasted based at least in part on cloud coverages of segments determined by the segment cloud coverage determination engine and forecast data generated by the trained forecast models. Embodiments of cloud movement forecast algorithm will be described in greater detail below in reference to FIG. 15. Any generated forecast data may be stored to one or more forecast databases.

Figure 8:
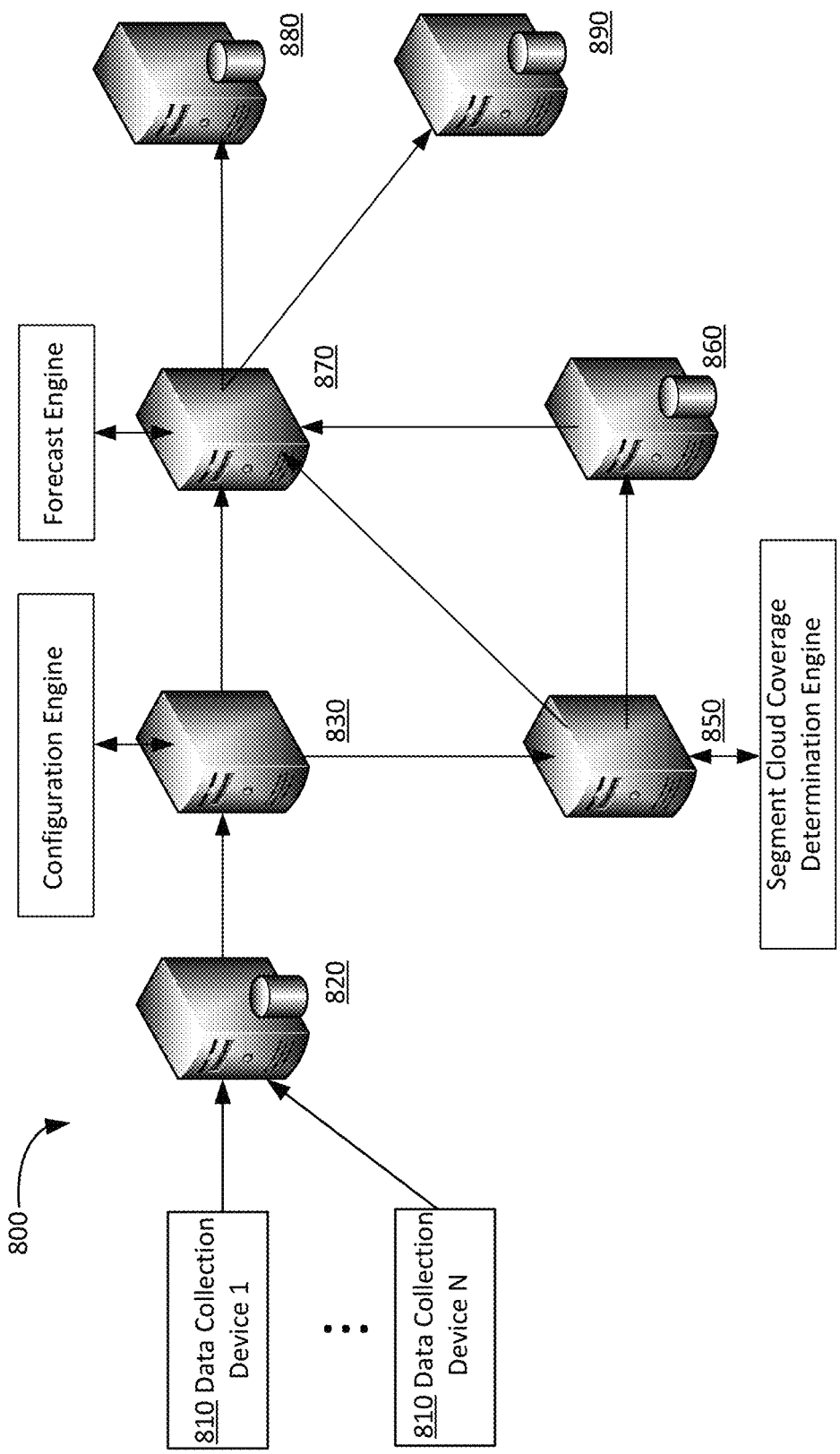
FIG. 8 is a schematic diagram illustrating an example system for cloud forecast that may be used in accordance with the present disclosure.

FIG. 8 illustrates an example system 800 for cloud forecast in accordance with the present disclosure. The system 800 may comprise a plurality of data collection devices 810 (e.g., the data collection devices 110), one or more databases 820 for storing collected data, a configuration engine 830, a segment cloud coverage determination engine 850, one or more databases 860 for storing determined data, a forecast engine 870, forecast databases 880 and 890 for storing forecast data. The plurality of data collection devices 810 are capable of collecting numerical data (e.g., temperature, humidity, barometric pressure) and capturing high-resolution sky images. The plurality of data collection devices 810 may be installed anywhere around the world. By way of example and without any limitation, the cameras of the data collection devices 810 may be programmed to take pictures and capture time-sequenced sky images every certain time interval, such as every three or five minutes.

The sky images collected by the plurality of data collection devices 810 may be stored in the databases 820. The configuration engine 830 is capable of generating configuration masks corresponding to camera lenses of the data collection devices 810 and applying the generated configuration masks to sky images captured by the camera lenses. The segment cloud coverage determination engine 850 is capable of determining cloud coverages of segments of any sky image and the sky image. The databases 860 may store determined cloud coverage data. The forecast engine 870 is capable of providing accurate cloud forecasts, such as cloud coverage and cloud movement forecasts. The forecast databases 880 and 890 may store cloud forecast data. In some examples, the forecast database 880 may be used to store forecast data indicative of future cloud conditions; the forecast database 890 may be used to store historical forecast data.

It should be appreciated that network topology illustrated in FIG. 8 has been greatly simplified and that many more networks and devices may be utilized to interconnect the various computing systems disclosed herein. It should also be appreciated that the system 800 described in FIG. 8 is merely illustrative and that other implementations might be utilized. Additionally, it should be appreciated that the functionality disclosed herein might be implemented in software, hardware or a combination of software and hardware. It should also be appreciated that the functionality disclosed herein may be implemented by one or more servers or computing devices. Other implementations should be apparent to those skilled in the art.

It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The plurality of data collection devices 810 may be the data collection devices 110 as described above. Preferably, numerous data collection devices 810 are locally-installed and they form a dense network of collecting sky images and numerical data, such as temperature and humidity. The data collection devices 810 may continuously collect numerical data. The data collection devices 810 comprise cameras, such as the cameras 112 as described above, for capturing sky images from the ground. Compared to Doppler radar cloud map and remote sensing signals from satellites, the data and images captured by the data collection devices 810 feature higher frequency and higher localization. The numerical data and sky images collected by the data collection devices 810 may be transmitted to and stored in the databases 820.

The data collection devices 810 each may be associated with a user identifier (i.e., user ID) and a device identifier (i.e., device ID). The data transmitted by the data collection devices 810 may comprise the corresponding user ID, device ID, camera information, location and time information in addition to the captured sky images and other data. In some examples, the data collection devices 810 each may be associated with a corresponding computing device. The user ID, device ID, camera information, location and time information may be transmitted by the corresponding computing device to the databases 820. One or more databases, such as the databases 820, may be created to contain data transmitted by the data collection devices 810 and/or the corresponding computing devices.

Figure 9:
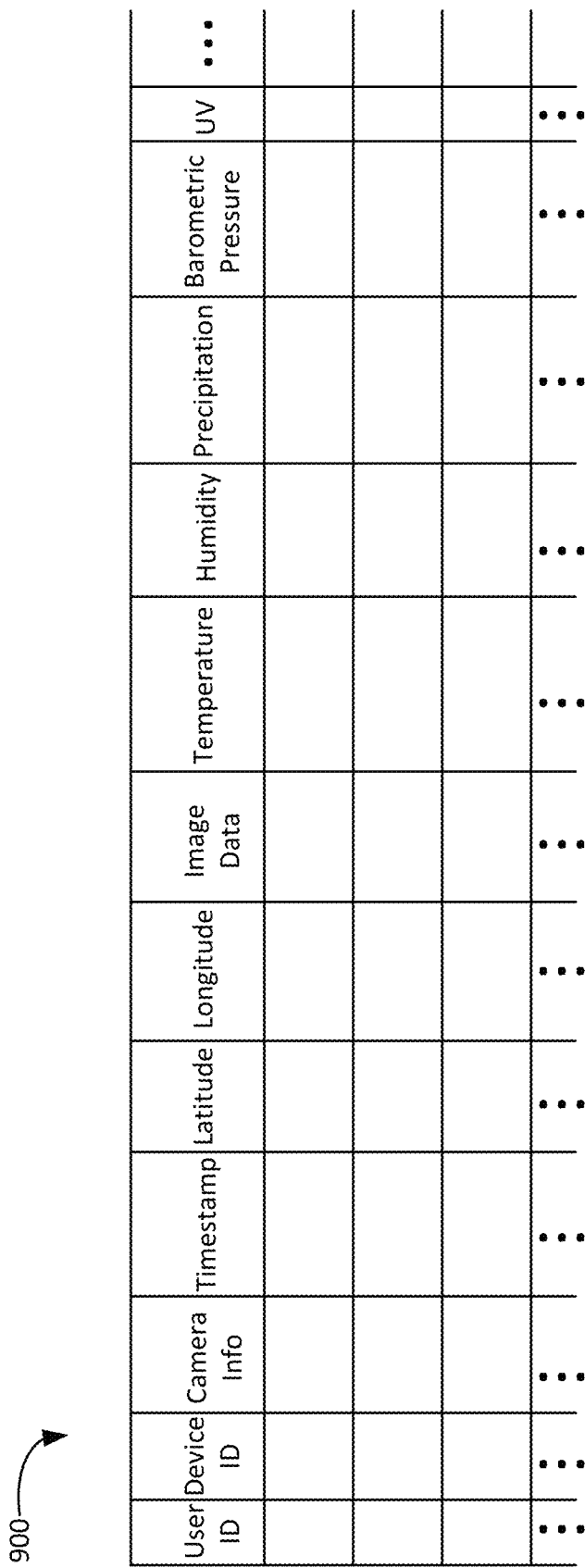
FIG. 9 is a simplified diagram illustrating example data metrics of a database for storing data collected by data collection devices.

FIG. 9 is a simplified diagram illustrating example data metrics 900 of the databases 820 that may be used in accordance with the present disclosure. As shown, data metrics 900 include user ID, device ID, camera information, timestamp, latitude, longitude, image data, temperature, humidity, precipitation, barometric pressure, UV exposure, and so on. Multiple databases may be organized in any suitable way that can support data processing. For instance, a separate database may be created to store sky images captured by the data collection devices 810 along with corresponding ID, camera information, timestamp, latitude and longitude. The databases 820 may be updated periodically in order to reflect new data. The databases 820 may be broken into subsets of data and processed in parallel by separate systems.

The databases 820 may provide sky images captured by cameras of the data collection devices 810 to the configuration engine 830. The configuration engine 830 in accordance with the present disclosure is capable of generating a configuration mask and applying the mask configuration to sky images. The configuration engine 830 may generate and provide data to the segment cloud coverage determination engine 850 for determining cloud coverages of segments of any sky image and the sky image. The configuration engine 830 may provide data (e.g., current image data) to the forecast engine 870 for cloud forecast.

The configuration engine 830 may access or receive various data, such as sky image data stored in the databases 820. The configuration engine 830 may also generate or cause to generate data. In some embodiments, the configuration engine 830 may monitor new images collected by the data collection devices 810. It should be understood that the configuration engine 830 may gather data from any of computing resources including servers, databases, storage, and the like.

The configuration engine 830 may generate different configuration masks corresponding to different cameras lenses used to capture sky images. The configuration engine 830 may generate a configuration mask reflecting cloud image on the imaging plane of a corresponding camera lens. In some embodiments, the data collection devices 810 comprise the fisheye lens as described above.

The configuration engine 830 may apply a generated mask configuration to sky images captured by the same type of camera lens. The configuration engine 830 may provide data to the segment cloud coverage determination engine 850 for processing. The segment cloud coverage determination engine 850 may generate or cause to generate data. In some examples, the segment cloud coverage determination engine 850 may provide data to the database 860 for storage. In other examples, the segment cloud coverage determination engine 850 may provide data to the cloud forecast engine 870 for training the cloud forecast engine 870 or evaluating accuracy of forecast data. The segment cloud coverage determination engine 850 is capable of determining cloud coverages of segments of sky images and the sky images.

Figure 10:
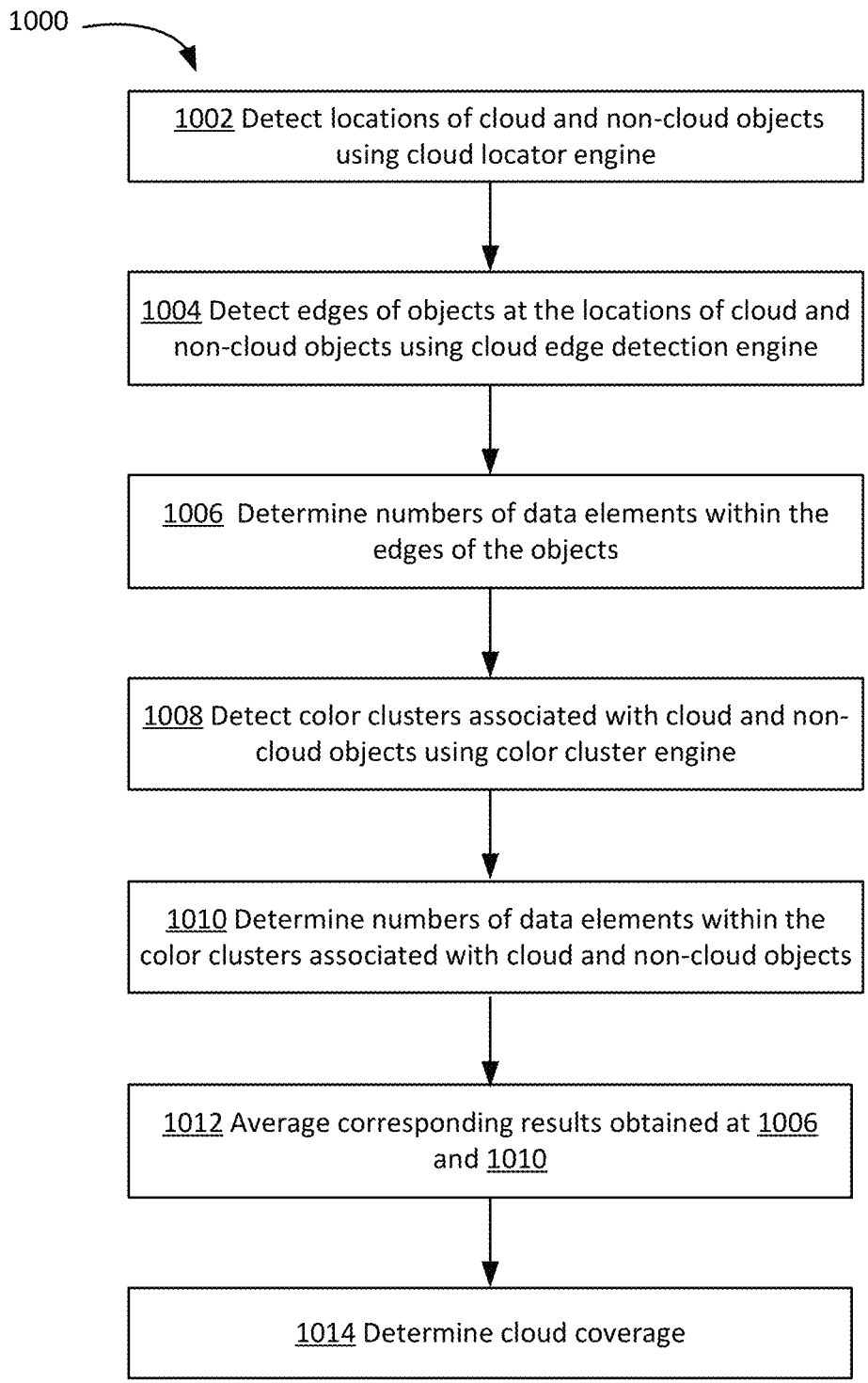
FIG. 10 is a flowchart illustrating an example process for determining cloud coverages of segments that may be used in accordance with the present disclosure.

FIG. 10 is a flowchart illustrating an example process 1000 for determining cloud coverages. A server or other computing device may be used singly or in combination to implement the cloud coverage determination process 1000.

Although depicted as a sequence of operations, those of ordinary skill in the art will appreciate that various embodiments may add, remove, reorder, or modify the depicted operations.

The cloud coverage determination process 1000 is empowered by deep learning and image processing, and may accurately determine cloud coverages of segments of sky images and the sky images. The cloud coverages determination process 1000 is an ensemble method by collaboratively using a cloud locator engine, an edge detection engine, and a color cluster engine. The cloud locator engine, the edge detection engine and the color cluster engine are described in detail in U.S. patent application Ser. No. 15/958,861 that is incorporated herein by reference in its entirety.

Operation 1002 illustrates detecting locations of cloud and non-cloud objects using the cloud locator engine. In some embodiments, the cloud locator engine may receive image data from the configuration engine 830. In other embodiments, the cloud locator engine may receive pre-stored image data processed by the configuration engine 830 or other similar algorithms from any other databases or storage devices. The same image data may also be provided to the color clustering engine for data processing. The cloud locator engine may detect cloud locations (i.e., cloud areas S0) and non-cloud object locations (i.e., non-cloud areas 51) in each portion of a sky image segmented by the configuration engine 830 or other similar algorithms that fall within the scope of this disclosure.

Operation 1004 illustrates detecting edges of clouds within the cloud areas S0 and edges of objects within the non-cloud areas 51 using the edge detection engine. In some embodiments, the edge detection engine may receive the data and information relating to the cloud areas S0 and the non-cloud areas 51 directly from the cloud locator engine. In other embodiments, pre-stored information relating to cloud areas S0 and non-cloud areas 51 may be provided to the edge detection engine for further processing. The edge detection engine may detect contours of clouds within the cloud areas S0 and contours of objects (e.g., non-sky objects and sun) within the non-cloud areas 51.

Operation 1006 illustrates determining the numbers of data elements (e.g., pixels) within the edges of the clouds or non-cloud objects, respectively. The number of pixels assigned within the edges of the clouds (S_cloudLocatorEdge) may be determined. Similarly, the number of pixels assigned within the edges of the non-sky objects (S_nonskyLocatorEdge) may be determined. The number of pixels assigned within the edge of the sun (S_sunLocatorEdge) may also be calculated. The number of the rest of pixels that are not assigned to clouds, sun, or non-sky objects (S_restskyLocatorEdge) may be determined as well given that the total number of pixels in each portion of the sky image (S_total) is known.

Operation 1008 illustrates detecting color clusters associated with clouds and non-cloud objects using the color cluster engine. Operation 1010 illustrates determining the numbers of data elements (e.g., pixels) within the color clusters associated with the clouds and non-cloud objects, respectively. The color cluster engine may detect color clusters associated with clouds or non-cloud objects in each portion of the sky image segmented by the configuration engine 830 or other similar algorithms.

The number of pixels within the detected color clusters associated with clouds (S_cloudClustering) may be determined. Similarly, the number of pixels within the detected color clusters associated with non-sky objects (S_nonskyClustering) and the number of pixels within the color clusters associated with the sun (S_sunSkyClustering) may be calculated, respectively. The number of the rest of pixels that are not assigned within the color clusters associated with clouds, sun, or non-sky objects (S_restskyClustering) may also be determined given that the total number of pixels in each portion of the sky image (S_total) is known.

Operation 1012 illustrates averaging corresponding results obtained at operations 1006 and 1010. The number of pixels belonging to the clouds in the same portion of the sky image may be determined using the formula of S_cloud=average (S_cloudLocatorEdge, S_cloudClustering). Similarly, the number of pixels belonging to non-sky objects may be obtained by averaging S_nonskyLocatorEdge and S_nonskyClustering, i.e., S_non-sky=average (S_nonskyLocatorEdge, S_nonskyClustering). The number of pixels belonging to the sun may be calculated by S_sun=average (S_sunLocatorEdge, S_sunClustering). The number of pixels belonging to the rest area in the sky image may be determined by S_restsky=average (S_restskyLocatorEdge, S_restskyClustering). In an example, the arithmetic mean may be used to average corresponding results obtained at operations 1006 and 1010. It should be appreciated that any suitable averaging techniques may be employed to average the corresponding results.

Operation 1014 illustrates determining a cloud coverage of each segment of a sky image. The cloud coverage may be determined based on a proportion of a number of pixels belonging to the clouds (S_cloud) to a number of pixels belonging the sky area (S_skytotal) in each portion of the sky image. In some embodiments, the S_skytotal may be determined by a total number of pixels in each portion of the image (S_total) minus a number of pixels belonging to the non-sky objects (S_non-sky), i.e., S_skytotal=S_total−S_non-sky. In this case, the cloud coverage may be determined using the formula of Coverage=S_cloud/(S_total−S_non-sky). In other embodiments, the S_skytotal may be determined using the formula of S_skytotal=S_cloud+S_sun+S_restsky; therefore, the coverage may be determined using the formula of Coverage=S_cloud/(S_cloud+S_sun+S_restsky).

In some embodiments, the segment cloud coverage data generated by the segment cloud coverage determination engine 850 may be stored into the one or more database 860 or other separate storage servers or computing devices. FIG. 11 is a simplified diagram illustrating example data metrics 1100 of the databases 860 that may be used in accordance with the present disclosure. As shown, data metrics 1100 include user ID, device ID, latitude, longitude, timestamp, segment No., determined segment cloud coverage, and image data, and so on. Multiple databases may be organized in any suitable way that can support data processing. The databases 860 may be updated periodically. The databases 860 may be broken into subsets of data and processed in parallel by separate systems.

In other embodiments, the data generated by the segment cloud coverage determination engine 850 may be directly fed into the forecast engine 870. The databases 860 may also provide segment cloud coverage data to the forecast engine 870. The forecast engine 870 may manage various data. The forecast engine 870 may also generate or cause to generate data. The forecast engine 870 may analyze the data, combine or aggregate the data or extract portions of the data as appropriate, and invoke trained models to generate segment cloud coverage forecast data.

The forecast engine 870 is capable of forecasting cloud coverage of each segment and further forecasting an overall cloud coverage of any particular sky area. The forecast engine 870 may train machine learning models for forecasting cloud coverage of each segment at a future time point. In some examples, the trained models are capable of forecasting segment cloud coverages at a future time point, such as 20-minute later than a current time point. It should be appreciated that trained models may forecast segment cloud coverages for any other time interval, e.g., 10-minute later.

Figure 12:
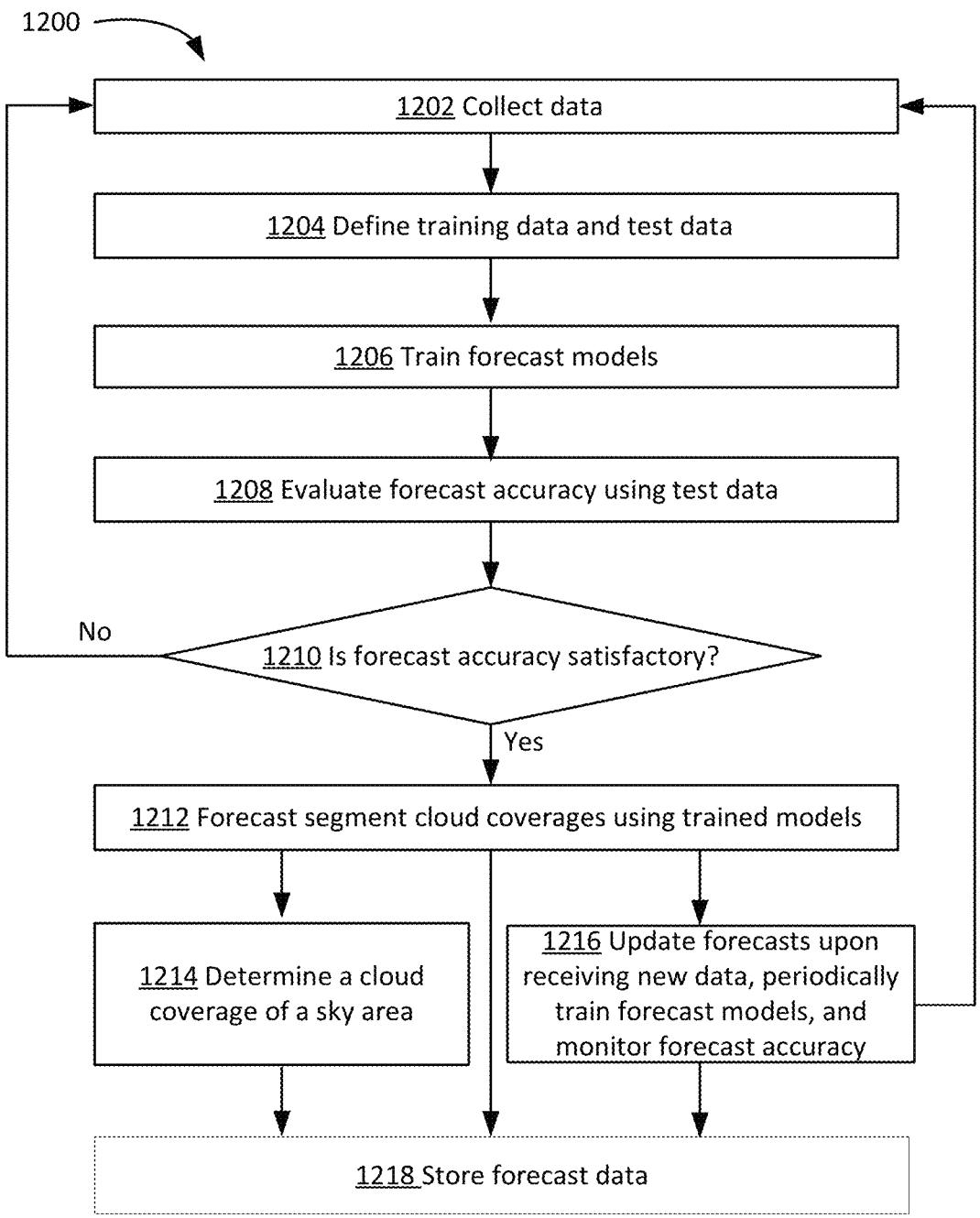
FIG. 12 is a flowchart illustrating an example process for cloud forecast that may be used in accordance with the present disclosure.

FIG. 12 is a flowchart illustrating an example process 1200 for cloud forecast. A server or other computing device may be used singly or in combination to implement the cloud forecast process 1200. Although depicted as a sequence of operations, those of ordinary skill in the art will appreciate that various embodiments may add, remove, reorder, or modify the depicted operations.

Operation 1202 illustrates collecting data. Data may be collected from any components, such as the databases 860 and the segment could coverage determination engine 850. In some embodiments, the collected data may comprise historical segment cloud coverages of time-sequenced sky images captured by the same type of camera lens.

Operation 1204 illustrates defining training data and test data. Preferably, two separate and independent sets of data are defined as training data and test data, respectively. The set of training data will be used to train forecast models for forecast cloud coverages of segments. The set of test data will be used to test the forecast models and evaluate their forecast accuracy.

Operation 1206 illustrates training forecast models using the set of training data. In some embodiments, historical cloud coverages of a plurality of segments in each of a series of time-sequenced sky images captured by the same type of camera at a particular location may be used to train a plurality of forecast models for forecasting cloud coverages of the plurality of segments at a future time. For example, the database 860 may provide time-sequenced cloud coverages of a plurality of segments (e.g., Segment 1 through Segment 48 as shown in FIG. 7) in a plurality of time-sequenced sky images to the forecast engine 870 for training forecast models. By training, a forecast model for a particular segment among the plurality of forecast models learns a correlation between cloud coverages of the plurality of segments at a time point T0 and a cloud coverage of the particular segment at a later time point T1. By way of example and without any limitation, T1 may equal to T0+20 minutes, T0+25 minutes, or others.

In other embodiments, historical cloud coverages of a particular segment in a series of time-sequenced sky images captured by the same type of camera at a particular location may be used to train a forecast model for forecasting cloud coverage of the particular segment at a future time. For example, the database 860 may provide time-sequenced cloud coverages of a particular segment (e.g., Segment 25 as shown in FIG. 7) to the forecast engine 870 for training a forecast model for that particular segment. By training, a forecast model for a particular segment learns a correlation between a cloud coverage of the particular segment at a time point and a cloud coverage of the particular segment at a later time point, such as 10-minute later and 20-minute later.

To well train forecast models, it is preferable to provide sufficient training data. In some examples, time-sequenced segment cloud coverages with a certain time interval (e.g., an interval of three or five minutes) during at least one hour (e.g. one hour or two hours) are provided as training data. The training data may be generated by the segment cloud coverage determination engine 850 using a series of time-sequenced sky images captured every certain time interval (e.g., every three or five minutes) by the same type of camera at a particular location. The time-sequenced sky images captured at a particular location cover a same sky area.

Figure 13:
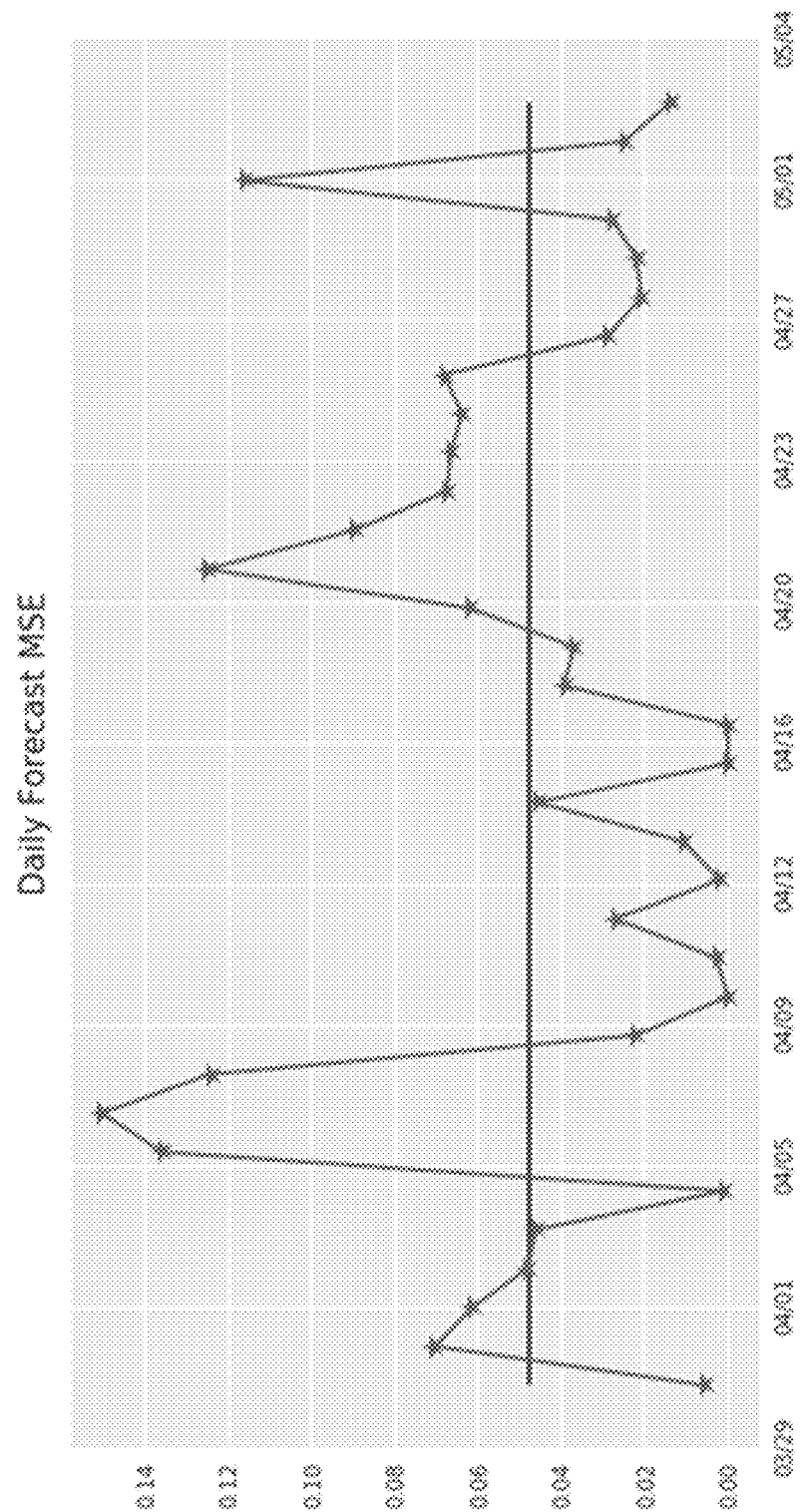
FIG. 13 illustrates an example of daily forecast MSE for evaluating forecast models' performance.

Operation 1208 illustrates evaluating performance of the trained forecast models using the set of test data. Various techniques may be employed to determine the forecast accuracy. In some embodiments, daily forecast MSE (mean square error) is employed to evaluate performance of trained forecast models. Daily forecast MSE is defined as:

$$\text{Daily MSE}_{day=i} = \Sigma_{time=j}(\text{cloud\_coverage\_forecast}_{i,j} - \text{cloud\_coverage\_actual}_{i,j})^2$$

Where "i" represents a date, and "j" represents a timestamp. FIG. 13 illustrates an example of daily forecast MSEs from Apr. 1, 2018 to May 4, 2018 during which daily forecasting starts at 8 am and ends at 6 pm. As shown in FIG. 13, several daily MSEs are extremely low, which indicates that those days are quite predictable, either very cloudy or very sunny. Some daily MSEs are relatively high, such as on April 7, which indicates a high variation of cloud coverages during those days.

Figure 14:
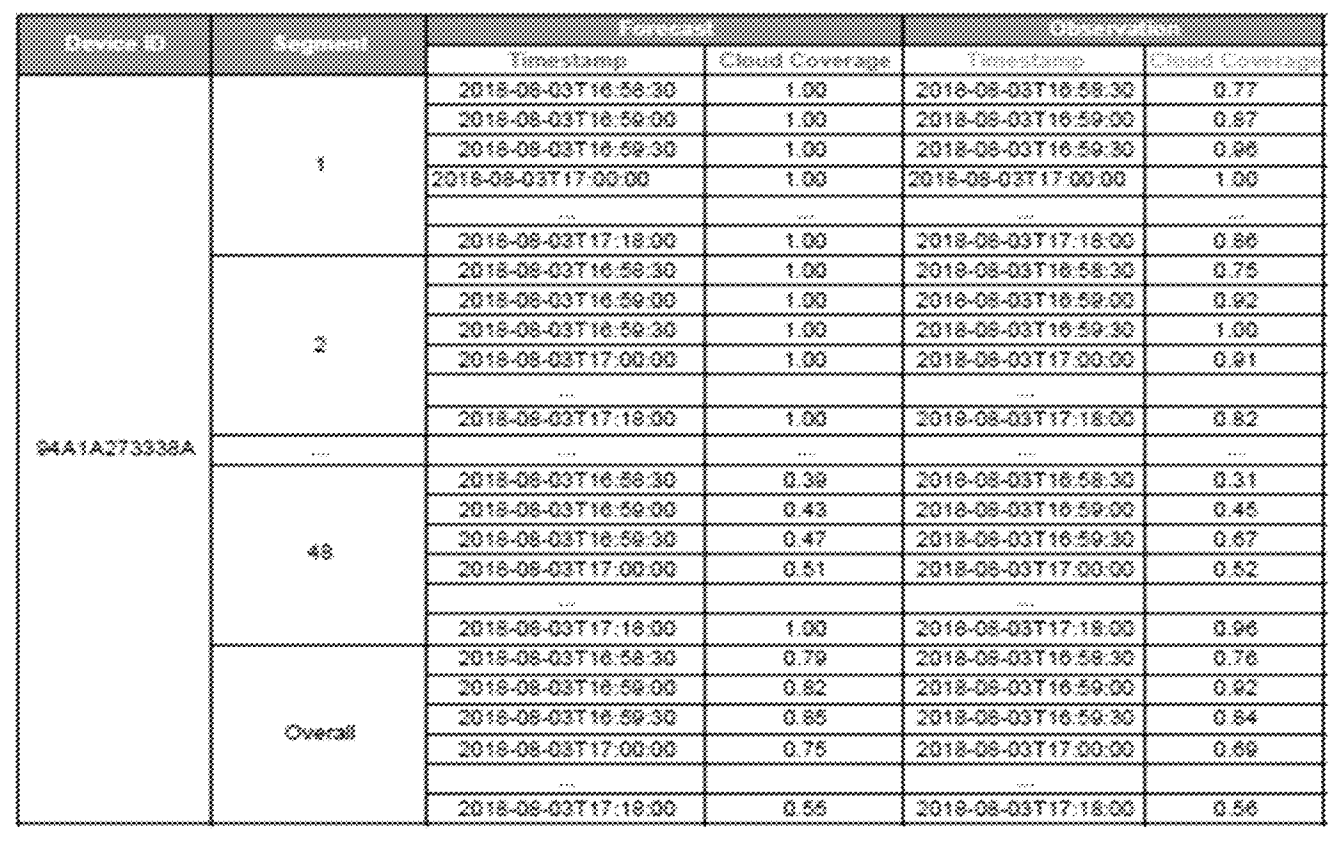

Operation 1210 determines whether the forecast accuracy is satisfactory. In some embodiments, forecast data for segments at any time point are compared with observation data for corresponding segments at the same time point to determine whether the forecast accuracy is satisfactory. The forecast data are generated by the trained forecast models; and the observation data are generated by the segment cloud coverage determination engine 850. The forecast data for segments at any time point may be saved in the forecast databases 880, 890, or any other storage device or database. When observation data for corresponding segments at the same time point become available, the forecast data are paired with and compared to the corresponding observation data based on their respective timestamps. FIG. 14 illustrates example comparisons between forecast data and observation data.

If the forecast accuracy is satisfactory, the forecast process 1200 may proceed to operation 1212. On the other hand, if the forecast accuracy is not satisfactory, the forecast process 1200 may return to operation 1202 and the operations 1202 through 1210 will be iterated. It should be appreciated that any suitable techniques for determining forecast accuracy may be employed.

Operation 1212 illustrates using a plurality of trained forecast models to forecast cloud coverages of a plurality of corresponding segments. In some embodiments, a trained forecast model for a particular segment among the plurality of forecast models learns a correlation between cloud coverages of a plurality of segments at a time point T0 and a cloud coverage of the particular segment at a later time point T1. In some examples, the trained forecast model for the particular segment is capable of forecasting a cloud coverage of the particular segment at a future time point using a current or near-current cloud coverage of the particular segment. The current or near-current cloud coverage of the particular segment may be provided and generated by the segment cloud coverage determination engine 850 using a current or near-current sky image for a sky area captured by the same type of camera.

Operation 1214 illustrates determining a cloud coverage of a sky area using segment cloud coverage forecasts. Segment cloud coverage forecasts generated by the trained forecast models may be used to determine a cloud coverage of a sky area covered by the current or near-current sky image. In some examples, the cloud coverage of the sky area are determined by averaging cloud coverages of segments generated by the trained forecast models. It should be understood that any other suitable methods may be employed to determine the cloud coverage of a sky area using segment cloud coverage forecasts generated by the forecast models.

Operation 1216 illustrates updating forecast data upon receiving new data, periodically training forecast models, and monitoring forecast accuracy of the forecast models. The forecast data may be updated over time as the latest data provided by the segment cloud coverage determination engine 850, the database 860, or others. The forecast models may periodically be trained. For example, the forecast models may be trained every week or every. In some embodiments, the forecast accuracy of the forecast models may be monitored on an on-going basis and used as a trigger to iterate operations 1202 through 1210.

Operation 1218 illustrates storing forecast data. Segment cloud coverage forecasts generated by the trained forecast models and cloud coverage forecasts for sky areas may be stored to one or more forecast databases. Users may retrieve the forecast data through one or more interfaces. In some examples, separate databases, such as the forecast databases 880 and 890, may be used to store forecast data for future time points and historical forecast data for past time points, respectively. Users may be provided at least two interfaces to access forecast data for future time points and historical forecast data, respectively. In some embodiments, observation data corresponding to historical forecast data may also be stored into one or more databases for storing historical forecast data, such as the forecast database 890. Users may retrieve the data and compare historical forecast data with corresponding observation date via an interface. It should be appreciated that forecast data and corresponding observation data may be stored in separate databases.

Figure 15:
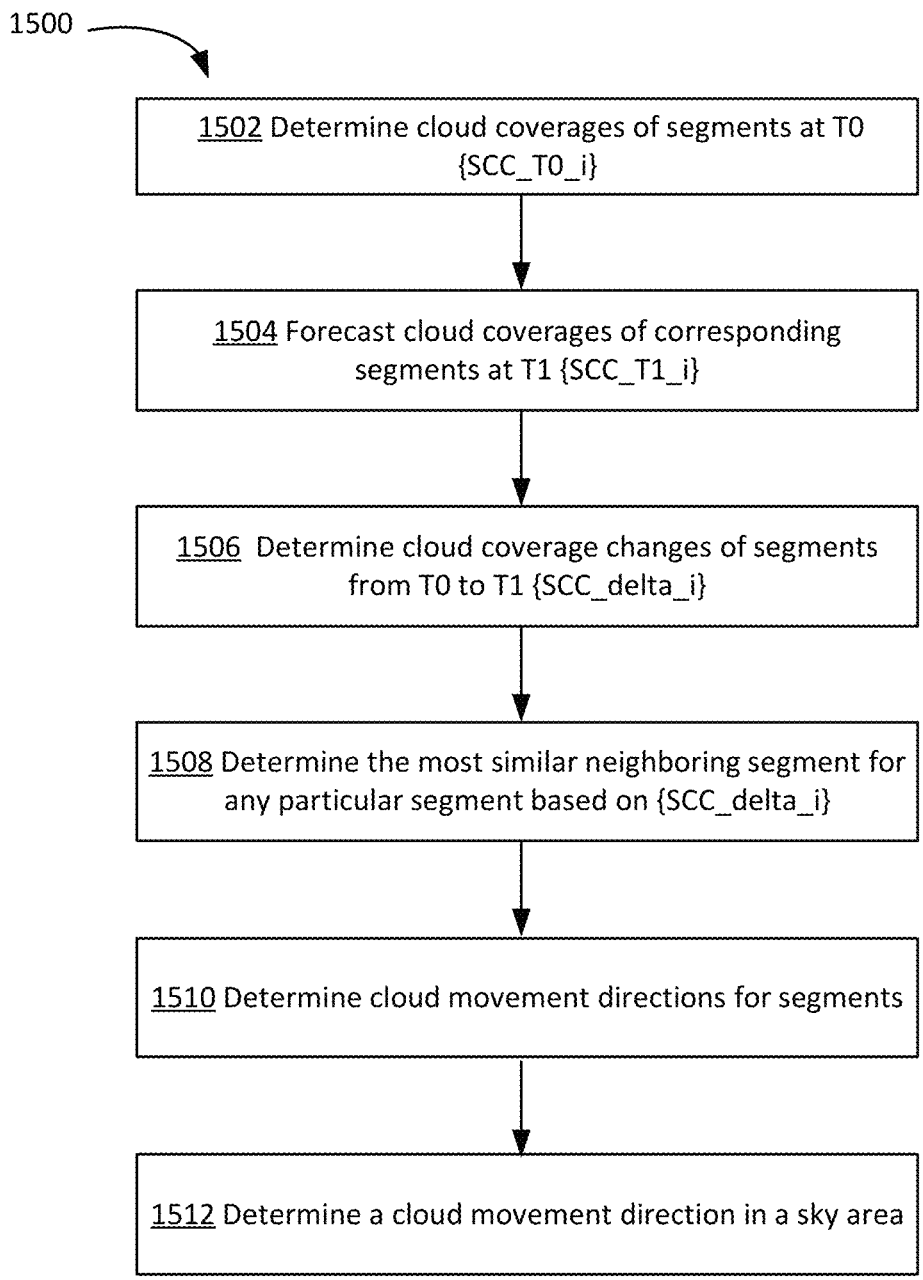
FIG. 15 is a flowchart illustrating an example process for cloud movement forecast that may be used in accordance with the present disclosure.

FIG. 15 is a flowchart illustrating an example process for cloud movement direction forecast in accordance with the present disclosure. The segment cloud coverage determination engine 850, the forecast engine 870, or other computing devices may be used singly or in combination to implement the cloud movement direction forecast process 1500. Although depicted as a sequence of operations, those of ordinary skill in the art will appreciate that various embodiments may add, remove, reorder, or modify the depicted operations.

Operation 1502 illustrates determining cloud coverages of segments of a sky image $\{SCC\_T0\_i\}$. "T0" represents a time point (i.e., a timestamp) and "i" represents a serial number of a segment (e.g., Segment No.) that may range from 1 to the largest Segment Number of the sky image. $\{SCC\_T0\_i\}$ represents a set of cloud coverages of segments of the sky image at the time point T0. In some embodiments, the sky image may be provided by the data collection device 810 or any other image capturing device. In other embodiments, the sky image may be provided by a database, such as the database 820. In some examples, the cloud coverages of segments of the sky image may be determined using the configuration engine 830 and the segment cloud coverage determination engine 850. The determined cloud coverages of segments are provided along with their corresponding timestamps and Segment Numbers. In other examples, the cloud coverages of segments of a sky image may be directly provided by a database for storing segment cloud coverages, such as the database 860, as well as their corresponding timestamps and Segment Numbers.

Operation 1504 illustrates forecasting cloud coverages of segments at a future time point $\{SCC\_T1\_i\}$. "T1" represents a future time point and "i" represents a serial number of each corresponding segment that may range from 1 to the largest Segment Number. $\{SCC\_T1\_i\}$ represents a set of cloud coverage forecasts of corresponding segments at the future time point T1. In some examples, the cloud coverage forecasts of corresponding segments with a timestamp T1 may be generated by the forecast engine 870 using the trained forecast models for corresponding segments. In other examples, the cloud coverage forecasts of corresponding segments with a timestamp T1 may be directly provided by a database for storing segment cloud coverage forecasts, such as the forecast database 880.

Operation 1506 illustrates determining cloud coverage change of each segment from T0 to T1 $\{SCC\_delta\_i\}$ represents a set of cloud coverage changes of segments from T0 to T1. By way of example and without any limitation, $\{SCC\_delta\_i\}$ may be signed numbers (i.e., positive or negative numbers). In some examples, the cloud coverage changes may be determined by the cloud coverage forecast of each segment at T1 minus the cloud coverage at T0 of a corresponding segment (i.e., sharing the same Segment Number i), i.e., $\{SCC\_delta\_i\}=\{SCC\_T1\_i\}-\{SCC\_T0\_i\}$.

Operation 1508 illustrates determining the most similar neighboring segment for any particular segment based on $\{SCC\_delta\_i\}$. In some examples, the most similar neighboring segment for a particular segment may be determined by comparing sums of the cloud coverage change of the particular segment and the cloud coverage changes of segment(s) neighboring the particular segment. In an example, if a sum of the cloud coverage changes of a neighboring segment and the particular segment has the smallest absolute value, the neighboring segment is identified as the most similar neighboring segment for the particular segment.

For instance, Segment k neighboring Segment j is determined as the most similar neighboring segment for Segment j when an absolute value of the sum of cloud coverage changes of Segment k and Segment j (i.e., $|SCC\_delta\_k+SCC\_delta\_j|$) is the smallest one among absolute values of sums of cloud coverage changes of Segment j and all segments neighboring Segment j (i.e., $\{|SCC\_delta\_segments\text{-}neighboring\text{-}Segment\ j+SCC\_delta\_j|\}$). It should be appreciated that any other suitable techniques may be employed to determine the most similar neighboring segment for each segment.

Operation 1510 illustrates determining cloud movement directions for segments. By way of example and without any limitation, the cloud movement direction for any particular segment (e.g., Segment j) from T0 to T1 may be determined based on the most similar neighboring segment (e.g., Segment k) of the particular segment and a sign of the cloud coverage change of the particular segment (e.g., sign of SCC_delta_j). In some embodiments, the most similar neighboring segment is deemed a destination or source to or from which a cloud of the particular segment moves during a time period of from T0 to T1. The sign of the cloud coverage change of the particular segment indicates whether the cloud moves from the particular segment to its most similar neighboring segment or vice versa. In an example wherein Segment k is determined as the most similar neighboring segment for the particular Segment j, if the sign of the cloud coverage change of Segment j (i.e., sign of SCC_delta_j) is negative, it indicates that the cloud movement direction is from the particular Segment j to its most similar neighboring Segment k. On the other hand, if the sign of SCC_delta_j is positive, it indicates that the cloud movement direction is from the most similar neighboring Segment k to the particular Segment j. It should be appreciated that any other suitable techniques may be used to determine cloud movement directions of segments.

Operation 1512 illustrates determining a cloud movement direction of a particular sky area covered by the sky image. By way of example and without any limitation, an overall cloud movement direction of the particular sky area may be determined based on the cloud movement directions of segments. For instance, a cloud movement direction that has the highest occurrence among the cloud movement directions of segments may be identified as the cloud movement direction of the particular sky area. It should be understood that any other suitable techniques may be used to determine a cloud movement direction in a particular sky area. The cloud moving direction information relating to segments and any particular sky area may be stored in any suitable databases or storage devices.

The above described aspects of the disclosure have been described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a user may be provided direct access to a resource instance, e.g., by giving a user an administrator login and password. In other embodiments, the provider network operator may allow users to specify execution requirements for specified applications and schedule execution of the applications on behalf of the user on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 16:
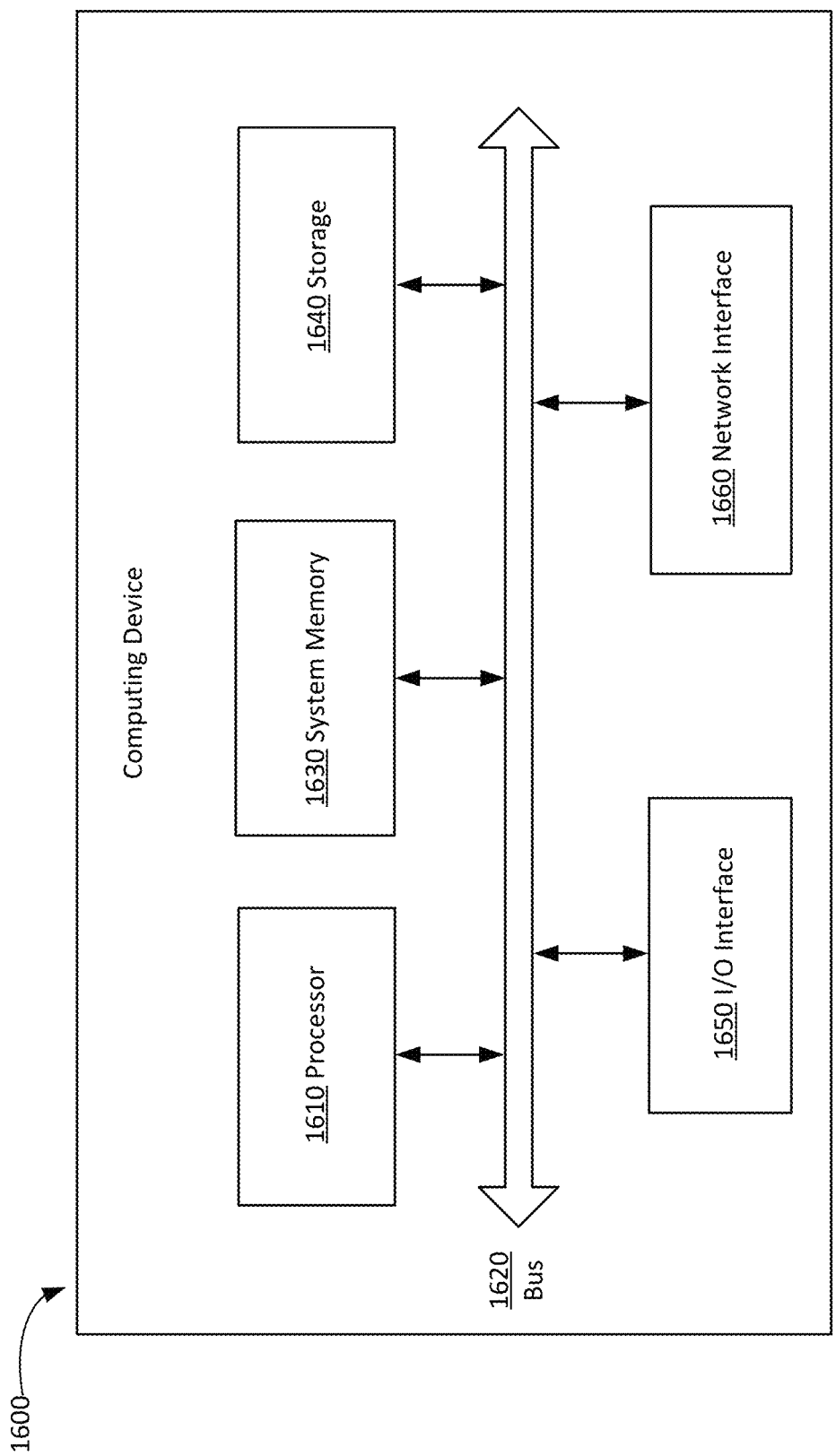
FIG. 16 is a schematic diagram illustrating an example computing device that may be used in accordance with the present disclosure.

In at least some embodiments, a server or computing device that implements a portion or all of one or more of the technologies described herein, including the techniques to implement the functionality of the configuration engine 830, the segment cloud coverage determination engine 850, and the forecast engine 870 may include a general-purpose computer system that includes or is configured to access one or more computer-accessible media. FIG. 16 illustrates such a general-purpose computing device 1600. In the illustrated embodiment, computing device 1600 includes one or more processors 1610 (which may be referred herein singularly as "a processor 1610" or in the plural as "the processors 1610") are coupled through a bus 1620 to a system memory 1630. Computing device 1600 further includes a permanent storage 1640, an input/output (I/O) interface 1650, and a network interface 1660.

In various embodiments, computing device 1600 may be a uniprocessor system including one processor 1610 or a multiprocessor system including several processors 1610 (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA.

System memory 1630 may be configured to store instructions and data accessible by processor(s) 1610. In various embodiments, system memory 1630 may be implemented using any suitable memory technology, such as static random access memory (SRAM), synchronous dynamic RAM (SDRAM), nonvolatile/Flash-type memory, or any other type of memory.

In one embodiment, I/O interface 1650 may be configured to coordinate I/O traffic between processor 1610, system memory 1630, and any peripheral devices in the device, including network interface 1660 or other peripheral interfaces. In some embodiments, I/O interface 1650 may perform any necessary protocol, timing, or other data transformations to convert data signals from one component (e.g., system memory 1630) into a format suitable for use by another component (e.g., processor 1610). In some embodiments, I/O interface 1650 may include support for devices attached through various types of peripheral buses, such as a variant of the Peripheral Component Interconnect (PCI) bus standard or the Universal Serial Bus (USB) standard, for example. In some embodiments, the function of I/O interface 1650 may be split into two or more separate components, such as a north bridge and a south bridge, for example. Also, in some embodiments some or all of the functionality of I/O interface 1650, such as an interface to system memory 1230, may be incorporated directly into processor 1610.

Network interface 1660 may be configured to allow data to be exchanged between computing device 1600 and other device or devices attached to a network or network(s), such as other computer systems or devices as illustrated in FIGS. 1 and 8, for example. In various embodiments, network interface 1660 may support communication via any suitable wired or wireless general data networks, such as types of Ethernet networks, for example. Additionally, network interface 1660 may support communication via telecommunications/telephony networks such as analog voice networks or digital fiber communications networks, via storage area networks such as Fibre Channel SANs or via any other suitable type of network and/or protocol.

In some embodiments, system memory 1630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 1600 via I/O interface 1650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1600 as system memory 1630 or another type of memory.

Further, a computer-accessible medium may include transmission media or signals such as electrical, electromagnetic or digital signals, conveyed via a communication medium such as a network and/or a wireless link, such as may be implemented via network interface 1660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of cloud forecast, comprising:
generating a configuration mask based on a type of an optical component for capturing a plurality of images, the plurality of images being time-sequenced and imaging a sky area;
determining cloud coverages of a plurality of corresponding segments in each of the plurality of images by applying the configuration mask and a segment cloud coverage determination algorithm to each of the plurality of images;
training a plurality of forecast models for forecasting cloud coverages of the plurality of corresponding segments using the determined cloud coverages, wherein a particular forecast model for a particular segment among the plurality of forecast models correlates cloud coverages of the plurality of corresponding segments at a time point with a cloud coverage of the particular segment at a later time point; and
generating a set of data indicative of cloud coverages of the plurality corresponding segments at a future time point using the plurality of forecast models.

2. The method of claim 1, further comprising:
determining a cloud coverage of the sky area at the future time point based on the cloud coverages of the plurality corresponding segments at the future time point.

3. The method of claim 1, wherein the segment cloud coverage determination algorithm further comprises a cloud locator engine, an edge detection engine, and a color cluster engine.

4. The method of claim 1, wherein there is a predetermined time interval between the time point and at the later time point.

5. The method of claim 1, wherein the predetermined time interval is twenty-minute.

6. The method of claim 1, wherein the optical component is a fisheye lens.

7. The method of claim 1, further comprising:
determining a cloud movement direction in the sky area based at least in part on the cloud coverages of the plurality corresponding segments at the future time point.

8. The method of claim 7, further comprising:
determining a most similar neighbouring segment for any particular segment based at least in part on changes of cloud coverages of segments among the plurality of corresponding segments from a current time point to the future time point.

9. The method of claim 8, further comprises:
generating forecast data indicative of cloud movement directions in the plurality of corresponding segments.

10. The method of claim 9, further comprises:
identifying a cloud movement direction that has a highest occurrence among the forecast data as the cloud movement direction in the sky area.

11. A system of cloud forecast, comprising:
a processor; and
a memory communicatively coupled to the processor to configure the processor at least to:
generate a configuration mask based on a type of an optical component for capturing a plurality of images, the plurality of images being time-sequenced and imaging a sky area;
determine cloud coverages of a plurality of corresponding segments in each of the plurality of images by applying the configuration mask and a segment cloud coverage determination algorithm to each of the plurality of images;
train a plurality of forecast models for forecasting cloud coverages of the plurality of corresponding segments using the determined cloud coverages, wherein a particular forecast model for a particular segment among the plurality of forecast models correlates cloud coverages of the plurality of corresponding segments at a time point with a cloud coverage of the particular segment at a later time point; and
generate a set of data indicative of cloud coverages of the plurality corresponding segments at a future time point using the plurality of forecast models.

12. The system of claim 11, the memory further configuring the processor at least to:
determine a cloud coverage of the sky area at the future time point based on the cloud coverages of the plurality corresponding segments at the future time point.

13. The system of claim 11, the memory further configuring the processor at least to:
determine a cloud movement direction in the sky area based at least in part on the cloud coverages of the plurality corresponding segments at the future time point.

14. The system of claim 13, the memory further configuring the processor at least to:
generate forecast data indicative of cloud movement directions in the plurality of corresponding segments based at least in part on changes of cloud coverages of the plurality of corresponding segments from a current time point to the future time point.

15. The system of claim 14, the memory further configuring the processor at least to:
identify a cloud movement direction that has a highest occurrence among the forecast data as the cloud movement direction in the sky area.

16. A non-transitory computer-readable storage medium bearing computer-readable instructions that upon execution on a computing device cause the computing device at least to:
generate a configuration mask based on a type of an optical component for capturing a plurality of images, the plurality of images being time-sequenced and imaging a sky area;
determine cloud coverages of a plurality of corresponding segments in each of the plurality of images by applying the configuration mask and a segment cloud coverage determination algorithm to each of the plurality of images;

train a plurality of forecast models for forecasting cloud coverages of the plurality of corresponding segments using the determined cloud coverages, wherein a particular forecast model for a particular segment among the plurality of forecast models correlates cloud coverages of the plurality of corresponding segments at a time point with a cloud coverage of the particular segment at a later time point; and generate a set of data indicative of cloud coverages of the plurality corresponding segments at a future time point using the plurality of forecast models.

17. The non-transitory computer-readable storage medium of claim 16, further comprising computer-readable instructions that upon execution on the computing device cause the computing device at least to:

determine a cloud coverage of the sky area at the future time point based on the cloud coverages of the plurality corresponding segments at the future time point.

18. The non-transitory computer-readable storage medium of claim 16, further comprising computer-readable instructions that upon execution on the computing device cause the computing device at least to:

determine a cloud movement direction in the sky area based at least in part on the cloud coverages of the plurality corresponding segments at the future time point.

19. The non-transitory computer-readable storage medium of claim 18, further comprising computer-readable instructions that upon execution on the computing device cause the computing device at least to:

generate forecast data indicative of cloud movement directions in the plurality of corresponding segments based at least in part on changes of cloud coverages of the plurality of corresponding segments from a current time point to the future time point.

20. The non-transitory computer-readable storage medium of claim 19, further comprising computer-readable instructions that upon execution on the computing device cause the computing device at least to:

identify a cloud movement direction that has a highest occurrence among the forecast data as the cloud movement direction in the sky area.

* * * * *